(12) United States Patent
Kikugawa

(10) Patent No.: US 8,705,328 B2
(45) Date of Patent: Apr. 22, 2014

(54) READ SIGNAL EVALUATION METHOD, INFORMATION RECORDING AND READING METHOD, AND INFORMATION RECORDING AND READING APPARATUS

(75) Inventor: Atsushi Kikugawa, Tokyo (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 178 days.

(21) Appl. No.: 13/300,783

(22) Filed: Nov. 21, 2011

(65) Prior Publication Data

US 2012/0213049 A1  Aug. 23, 2012

(30) Foreign Application Priority Data

Feb. 23, 2011  (JP) ................................ 2011-037574

(51) Int. Cl.
  *G11B 15/52* (2006.01)
(52) U.S. Cl.
  USPC ..................................... 369/47.28; 369/53.31
(58) Field of Classification Search
  None
  See application file for complete search history.

(56) References Cited

U.S. PATENT DOCUMENTS

| | | | |
|---|---|---|---|
| 2003/0090980 A1* | 5/2003 | Kashihara et al. | 369/53.31 |
| 2005/0213462 A1 | 9/2005 | Maegawa | |
| 2009/0245048 A1 | 10/2009 | Ueda et al. | |
| 2009/0316539 A1 | 12/2009 | Mikami et al. | |
| 2010/0054097 A1* | 3/2010 | Miyashita et al. | 369/47.53 |
| 2010/0188953 A1 | 7/2010 | Imai | |
| 2010/0260025 A1 | 10/2010 | Minemura et al. | |
| 2011/0096652 A1* | 4/2011 | Miyashita et al. | 369/53.35 |
| 2012/0243393 A1* | 9/2012 | Nishimura et al. | 369/59.11 |

FOREIGN PATENT DOCUMENTS

| | | |
|---|---|---|
| JP | 2005-259317 | 9/2005 |
| JP | 2008-47181 | 2/2008 |
| JP | 2008-97723 | 4/2008 |
| JP | 2009-238285 | 10/2009 |
| JP | 2009-252337 | 10/2009 |
| JP | 2009-328285 | 10/2009 |
| JP | 2009-259323 | 11/2009 |
| JP | 2010-250881 | 11/2010 |

OTHER PUBLICATIONS

Kunjithapatham Balasubramanian et al., Multilevel-enabled Double-Density Writable and Rewritable Digital Versatile Disc System, Japanese Journal Applied Physics, Feb. 2003, pp. 1062-1067, vol. 42, Part 1, No. 2B.
Japanese Office Action with partial English translation; Application No. 2011-037574 dated Nov. 12, 2013.

(Continued)

*Primary Examiner* — Paul Huber
(74) *Attorney, Agent, or Firm* — Antonelli, Terry, Stout & Kraus, LLP.

(57) ABSTRACT

A read signal evaluating means for ensuring compatibility in an optical phase multilevel recording and reading system is provided. In addition, a decoding means not large in circuit scale is provided. An optical phase is modulated based on user data, and phase information thus obtained is recorded in a recording medium. Then, the phase information recorded in the recording medium is optically read, and is converted into an electric signal. The signal is subjected to adaptive equalization and to partial response most-likely decoding. A shift in a time axis direction from a target wave of a predetermined pattern is detected from the read phase information and a statistical average is calculated. Meanwhile, a value of the phase read from the predetermined pattern is extracted from the read phase information and a statistical average is calculated.

13 Claims, 15 Drawing Sheets

(56) References Cited

OTHER PUBLICATIONS

"Hitachi Hyoron vol. 93 No. 1 2011: Prospects of Hitachi technology (Research and Development: high capacity/high speed optical disc for phase multilevel recording and reading)," Hitachi Hyoronsha, Jan. 1, 2011, vol. 93, p. 128.

* cited by examiner

READ SIGNAL EVALUATION METHOD, INFORMATION RECORDING AND READING METHOD, AND INFORMATION RECORDING AND READING APPARATUS

CLAIM OF PRIORITY

The present application claims priority from Japanese patent application JP 2011-037574 filed on Feb. 23, 2011, the content of which is hereby incorporated by reference into this application.

BACKGROUND OF THE INVENTION

1. Field of the Invention

The present invention relates to a method of recording and reading information using an optical phase, a method of evaluating a read signal, and an information recording and reading apparatus for implementing the methods.

2. Description of the Related Art

The following description includes some terms provided using expressions used for a Blu-ray Disc (BD). Other terms may be used in the case of systems other than a BD system. However, it is easy for those skilled in the art to read the terms for the BD as the terms in the other systems.

Increase in storage capacity of an optical disc has been achieved by increasing the number of recording layers per disc in addition to using an optical source having a shorter wavelength and increasing a numerical aperture (NA) of an objective lens. A dual layer BD using a blue semiconductor laser and a high-NA objective lens having an NA of 0.85 achieves a storage capacity of 50 GB. Moreover, a BD XL having has been put to practical use in 2010. The BD XL achieves a storage capacity of 100 GB or higher by increasing the number of recording layers to 3 or 4 and enhancing the surface recording density at the same time.

However, the reduction in the recording wavelength and the increase in the NA of the objective lens are almost reaching the limits and it is not easy to drastically increase a surface recording capacity. Therefore, one of potent solutions for increasing the recording capacity over the above described level is to further increase the number of recording layers. With use of the same configuration as a conventional multi-layer optical disc, however, a simple increase in the number of recording layers, even if achieved, is highly likely to fail reduction in cost per storage capacity. This is because manufacturing costs and yields of currently available multilayer optical discs are mainly determined by formation processes of recording layers. That is to say, an increase in the number of layers is directly linked to an increase in the number of processes and a final yield is basically determined by a value of a yield of a stamping process per layer raised to the power of the number of layers.

To address this, studies are in process on an optical disc not including physically defined recording layers unlike a conventional multilayer disc and a recording technique for such an optical disc. In one example, Patent Document 1 discloses a technique for recording a micro-hologram, i.e., a minute interference fringe, within interior of a recording region made of a photorefractive material. Since there are no structures for physically defining recording positions in this recording region, a recording position of each micro-hologram is determined by indirectly controlling a focal position of light used for recording (recording light). In another example, there is also a technique to perform recording by forming voids in a recording region as described in Patent Document 2. According to these recording methods, it is possible to increase virtual recording layers relatively freely and to increase the recording capacity per disc easily. It is to be noted that the above-described methods using no layer for physically defining the recording positions in the recording regions will be generally referred to as volume recording in this specification for convenience sake.

Reduction in the amount of reflecting light from a layer used for reading is a problem in the cases of increasing the number of recording layers including the above-described case of volume recording. Since output of a recording light source is limited, a disc provided with multiple recording layers needs to include intermediate recording layers each having sufficiently high transmissivity in order to record on the layer farthest from an entrance plane of reading light. In other words, optical reflectivity and absorptance of each of the layers needs to be sufficiently small. Meanwhile, since a recording film is set to have high recording sensitivity for recording on the recording layer having small absorptance, there is a limit to increase power of an outgoing beam (reading light) from a pick-up at the time of reading. For this reason, the amount of light returning from a recording layer at the time of reading generally becomes smaller with an increase in the number of recording layers. Accordingly, there is a problem of reduction in a signal to noise ratio (SNR) of a read signal.

As a technique for coping with the reduction in the SNR of the read signal, there is a signal amplitude amplification technique based on application of optical interference as disclosed in Patent Document 3. Specifically, this technique amplifies the read signal by causing reference light (beam) obtained from a light source which also emits reading light to interfere with reflecting light of the reading light from a recording layer on an optical detector. It is to be noted that the method of causing the reference light obtained from the light source which also emits the reading light to interfere with the reading light on the optical detector and a reading optical system for that purpose will be respectively referred to as a homodyne detector and a homodyne detection system in this specification.

One of key performances of an optical disc drive is a data transfer rate (hereinafter simply referred to as a transfer rate) at the time of recording and reading. This is an important performance factor particularly in the case of non-consumer use. The transfer rate is primarily determined by a linear recording density and a linear speed of a disc. Meanwhile, the linear speed of the disc is limited by an achievable revolution speed of the disc. In the case of a disc having a diameter of 12 cm and being made of polycarbonate, which is used in almost all discs, the revolution speed of the disc is estimated to have a limit around 10000 rpm (rotations per minute) considering vibration and deformation.

The linear recording density is primarily determined by optical resolution of a reading head, and is determined further in consideration of a practical performance margin as well as a performance increasing effect attributed to signal processing. The optical resolution is determined by a wavelength of a light source used by the head and an opening ratio of an objective lens. Specifically, an upper limit for the transfer rate of the optical disc drive is mainly determined by the limit of the achievable revolution speed of the disc and by the linear recording density. The above-mentioned matters are known to those skilled in the art and further detailed description will therefore be omitted herein.

Nevertheless, the optical resolution is almost reaching the limit as described previously. A multilevel recording method for recording information exceeding 1 bit per channel clock is a method highly expected to further improve the transfer rate in this situation instead of conventional binary recording of recording 1 bit per channel clock. The multilevel recording method also increases a storage capacity per unit length, which naturally leads to an increase in the storage capacity of the disc.

As the multilevel recording method, there is a technique disclosed in Non-patent Document 1. In this technique, a recording waveform is improved to increase the number of levels in modulation of the reflectivity of a recording film of a kind similar to in a conventional optical disc from two levels to eight levels, and thereby the storage capacity is increased. However, since the amplitude of the read signal is the same as that in the conventional optical disc, the SNRs at signal levels corresponding to the respective levels of reflectivity are reduced. Accordingly, this technique is not always suitable for improving the transfer rate.

RELATED ART DOCUMENTS

Patent Documents

Patent Document 1: JP 2008-97723 A
Patent Document 2: JP 2009-238285 A
Patent Document 3: JP 2009-252337 A
Patent Document 4: JP 2010-250881 A Non-Patent Document Non-patent Document 1: Jpn. J. Appl. Phys., Vol. 42 (2003), pp. 1062-1067

SUMMARY OF THE INVENTION

Problem to be Solved by the Invention

The present invention provides a signal evaluation method for achieving an increase in a storage capacity and improvement in a transfer rate at the same time and to ensure compatibility between different drives in an optical recording and reading technique using a multilevel recording method. The present invention also provides an apparatus for implementing these features.

As described previously, replacement of the binary recording configured to record 1 bit per channel clock with the multilevel recording method configured to record the information exceeding 1 bit per channel block is one way of dramatically improving the transfer rate as compared to the conventional technique under the limits for improving the revolution speed and the linear recording density of the disc. In the following, an information unit to be recorded in 1 channel clock will be simply referred to as a symbol. Similarly, a channel bit will be simply referred to a bit to the extent of not causing any confusion. Meanwhile, data to be recorded before coding will be referred to as user data and a minimum unit in a binary expression thereof will be referred to as a user bit. Accordingly, 1 symbol corresponds to 1 bit, i.e., 1 user bit in non-coded binary recording, for example. Similarly, 1 symbol corresponds to 3 bits, i.e., 3 user bits in non-coded eight-level recording. Although the expression "symbol" is a term that is broadly used in this technical field, this expression will be used to represent the above-described meaning to the extent of not causing any confusion.

As described in the section of the Description of the Related Art, for realizing the multilevel recording and reading system, it is difficult to improve the transfer rate when a signal to be obtained at the time of reading the information expresses the information only by means of amplitude modulation. Considering a case of an optical disc such as a DVD or a BD using a change in reflecting light intensity, an interval of light intensity for deciding a value of each symbol is reduced. Accordingly, an error rate at the time of deciding a level of each symbol becomes greater than an error rate in the case of binary recording and reading. This aspect becomes more significant in the case of using a circuit system having a bandwidth necessary for high speed transfer. As a consequence, it is difficult to achieve the high speed transfer.

The optical disc system has a feature that recording medium is exchangeable. Therefore, it is essential to ensure compatibility among drives applying the same standard. It is well known to those skilled in the art that a conventional optical disc system ensures the compatibility by defining an error rate under a prescribed reading condition and a jitter as quality of a read signal, for example. In the multilevel recording using phase recording, it is easily imaginable to define at least a symbol error rate likewise. Nevertheless, it is easily predicted that the quality of the record signal in the phase recording cannot be defined by the jitter. Specifically, one of problems for ensuring compatibility in an optical phase multilevel recording and reading system is to provide an appropriate read signal evaluation means.

Means for Solving the Problem

A signal evaluation method of the present invention includes the steps of: optically reading digital information stored in a recording medium as a phase signal of light; and extracting a phase value corresponding to a predetermined digital pattern from the read phase signal. The method may further include the step of extracting a shift in a time axis direction from a target wave corresponding to the predetermined digital pattern is extracted from the read phase signal in addition to the phase value.

An information recording method of the present invention recodes digital information in a recording medium so that the digital information is optically readable as an optical phase, and includes the steps of: optically reading the digital information stored in the recording medium as a phase signal of light; extracting a phase value corresponding to a predetermined digital pattern from the read phase signal; and changing a recording condition so as to approximately equalize the extracted phase value to a predetermined value. The method may further include the steps of: extracting a shift in a time axis direction from a target wave corresponding to the predetermined digital pattern from the read phase signal in addition to the phase value corresponding to the predetermined digital pattern; and changing a recording condition so as to approximately equalize the shift in the time axis direction to a predetermined value.

A read signal evaluation apparatus of the present invention includes: a reading unit configured to read digital information stored in a recording medium as a phase signal; a decoder configured to decode the phase signal; a pattern detector configured to detect a predetermined digital pattern in the decoding result by the decoder; and a calculating means for calculating a statistical average of the phase signal from which the predetermined digital pattern is detected by the pattern detector. It is also possible to use PRML (partial response most-likely) decoder as the decoder and to define the predetermined length of the digital pattern as a length equal to or longer than a PR-class constraint length used in the PRML decoder.

An information recording and reading apparatus of the present invention is an information recording and reading apparatus configured to record digital information as an optical phase on a recording medium so as to be optically readable and to read the digital information. For example, the device includes a means for convolving user data, a means for interleaving the convolved digital information, a means for modulating a phase of a laser beam emitted from a light source and recording phase information on the recording medium, a homodyne detection system configured to optically read the phase information recorded on the recording medium, a means for decoding the optically read phase information into the digital information by using a PRML method, a means for de-interleaving the digital information obtained by decoding, and a means for obtaining the user data by Viterbi decoding the interleaved digital information.

Effect of the Invention

The present invention realizes a reading system capable of decoding a multilevel-recorded signal while suppressing an increase in the circuit scale. Moreover, it is easier to ensure compatibility in the optical phase multilevel recording and reading system by providing the appropriate read signal evaluating means.

The problems, configurations, and effects other than those described above will become clear in conjunction with the following description of embodiments.

DESCRIPTION OF THE PREFERRED EMBODIMENTS

Figure 2:
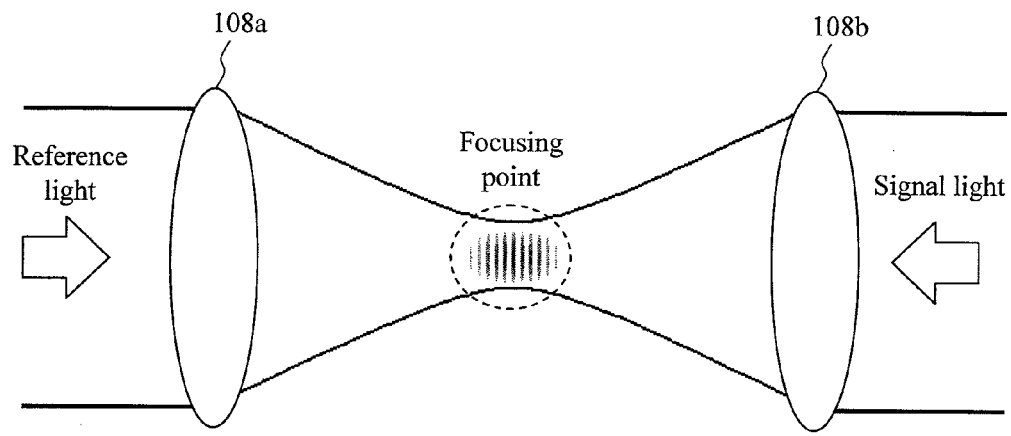
FIG. 2 is a diagram illustrating micro-hologram recording.

A conceivable method of solving the problem of the transfer rate in the above-described multilevel recording and reading system is to use information other than the amplitude, or namely the phase. The method based on the micro-hologram as disclosed in Patent Document 2 is a conceivable method of recording the phase in optical recording. In the method disclosed in Patent Document 1, the micro-hologram is simply used as a minute reflector. As shown in FIG. 2, the micro-hologram forms a recording mark by focusing two laser beams emitted from a single light source in the same position by using two objective lenses 108a and 108b and then recording an interference fringe in the vicinity of the focal point. When reading, reflecting light intensity from the recording mark made of this micro-hologram is detected as with a conventional optical disc.

Figure 3:
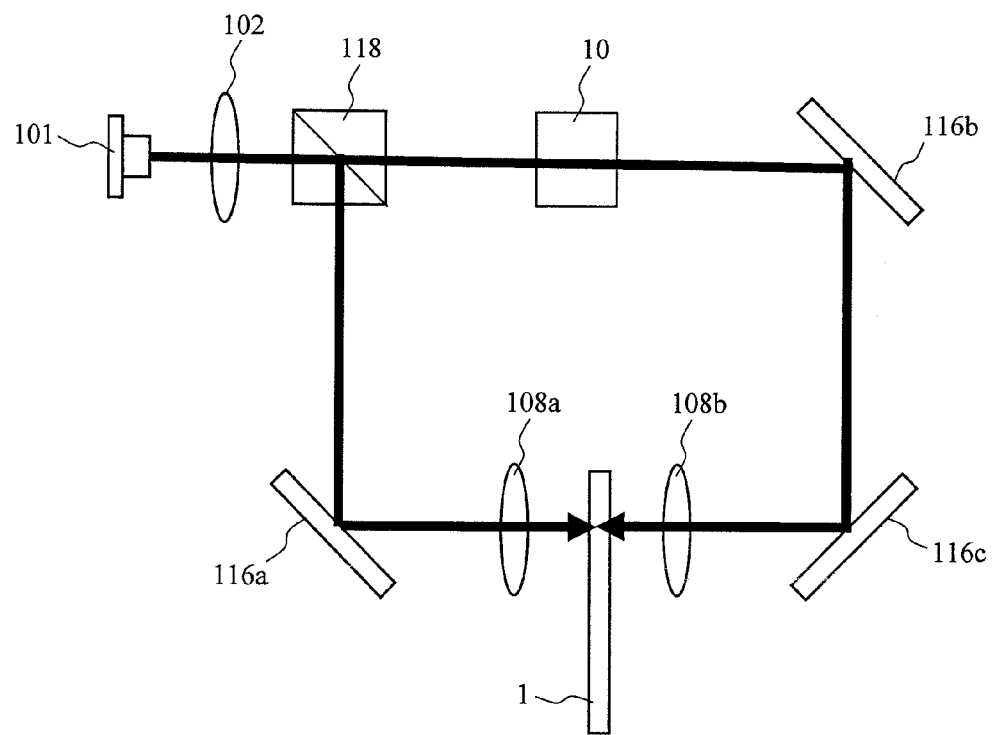
FIG. 3 is a view for explaining a method of phase recording based on a micro-hologram.

In order to record a phase in the micro-hologram, the phase of one of the two laser beams used for recording should be modulated in accordance with recording data as shown in FIG. 3. A laser beam emitted from a semiconductor laser 101 is converted into a parallel beam by a collimator lens 102 and is then split into two beams by a non-polarizing half-beam splitter 118. One of the laser beams passes through a mirror 116a to be focused inside a recording medium 1. The other laser beam passes through a phase modulator 10 and then through mirrors 116b and 116c as well as the objective lens 108b. This laser beam is then similarly guided into the recording medium 1 and the two laser beams are focused in the same position. Here, the position in an optical axis direction of the interference fringe forming the micro-hologram is changed when the phase modulator 10 is driven based on the recording data. That is, an array of the interference fringe forming the micro-hologram recorded in accordance with this method exhibits a positional change based on a recording data stream.

In the case of irradiating the micro-hologram with reading light, the reading light is reflected by each interference fringe constituting the micro-hologram so that the micro-hologram can be regarded as a single reflector as a whole. Therefore, when the position in the optical axis direction of the interference fringe forming the micro-fringe is changed, the phase of the reflected reading light is changed. Accordingly, the phase recorded on each micro-hologram can be determined by determining the phase of this reflected recording light. Meanwhile, in the phase recording using the micro-hologram, there are no physically defined recording surfaces or recording layers unlike the conventional optical disc. However, in order to simplify the following explanation, a hologram recorded into a planar shape will be hereinafter referred to as a recording layer or a recording surface for convenience sake. Similarly, the micro-holograms recorded into an arrayed shape will be hereinafter referred to as a track.

Phase diversity homodyne detection techniques (hereinafter referred to as homodyne detection) can be used as a means for detecting the phase change of the light reflected by the micro-hologram. Now, these techniques will be described. First, the homodyne detection will be described. It is to be noted, however, that the homodyne detection as well as a structure and operations of an optical disc device using the homodyne detection can be easily understood by those skilled in the art by referring to Patent Document 3. Accordingly, only the outline that is necessary for describing the present invention will be explained below.

Figure 4:
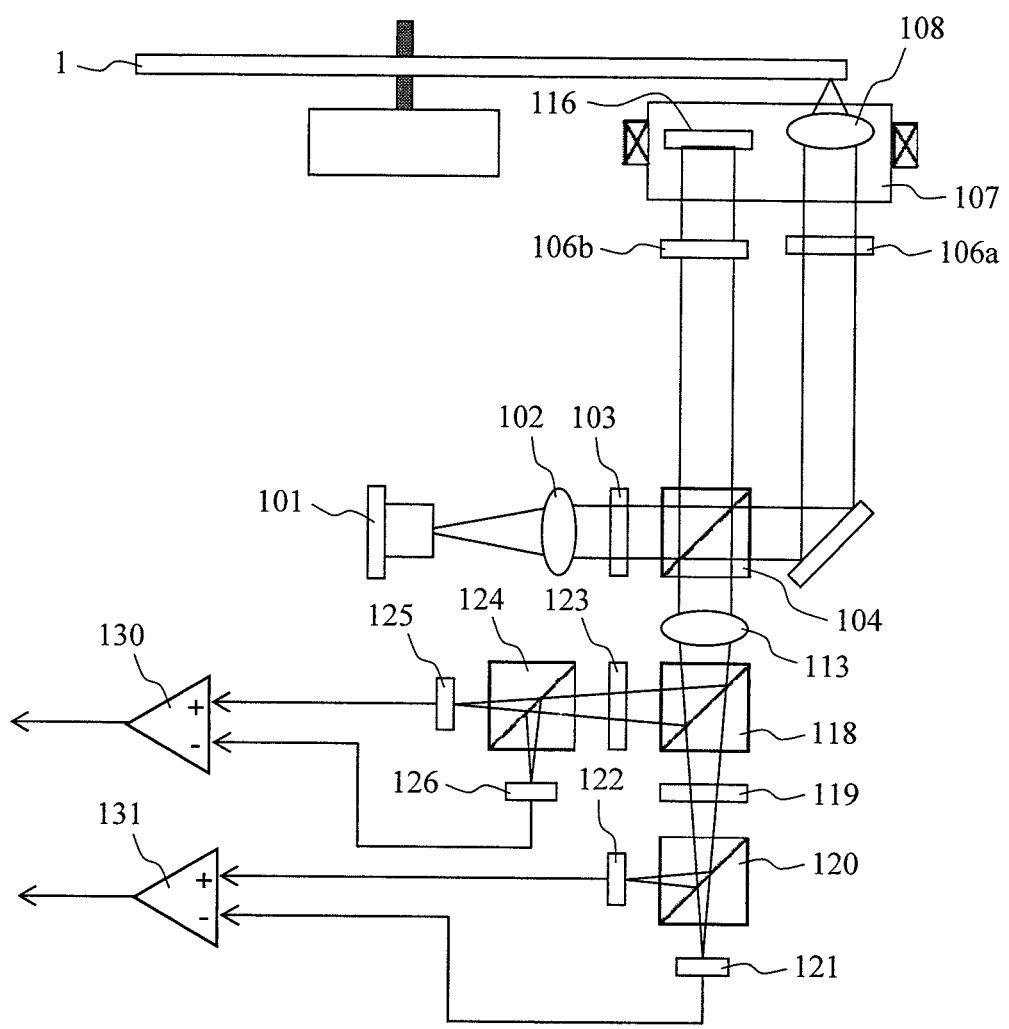
FIG. 4 is an explanatory view of a homodyne detection technique.

FIG. 4 is an operation explanatory diagram of a homodyne detection system. The light from the semiconductor laser 101 is formed into parallel light by the collimator lens 102, and then passes through a half-wavelength plate 103 and is made incident on a polarizing beam splitter 104. The polarizing beam splitter 104 has a function to transmit almost 100% of p-polarized light (hereinafter referred to as horizontally polarized light) and to reflect almost 100% of s-polarized light (hereinafter referred to as vertically polarized light) that are incident on a splitting surface. Here, it is possible to adjust an intensity ratio between the transmitting light and the reflecting light by adjusting an angle of rotation of the half-wavelength plate around the optical axis. The light transmitted through the polarizing beam splitter 104 passes through a quarter-wavelength plate 106a to be converted into circularly-polarized light. Then, this light is focused into the recording layer on the optical disc 1 by use of an objective lens 108 mounted on a two-dimensional actuator 107. The reflecting light from the optical disc 1 returns on the same optical path, and is formed into parallel light by the objective lens 108. The reflecting light is converted into linearly polarized light having a direction of polarization turned by 90° relative to the original incident beam by the quarter-wavelength plate 106a, and is then made incident on the polarizing beam splitter 104. Since the direction of polarization is turned by 90°, the light is reflected by the polarizing beam splitter 104 and made incident on a condenser lens 113.

In the meantime, the light emitted from the semiconductor laser 101 and reflected by the polarizing beam splitter 104 passes through a quarter-wavelength plate 106b to be converted into circularly-polarized light. Then, this light is made incident on a mirror 116 mounted on the two-dimensional actuator 107. The light reflected by the mirror (a corner cube prism) 116 returns on the same optical path, and passes through the quarter-wavelength plate 106 and is made incident on the polarizing beam splitter 104. Since the light passes through the quarter-wavelength plate twice (ongoing and returning), the light is converted into linearly polarized light having the direction of polarization turned by 90° relative to the original incident beam. Accordingly, the reflecting light passes through the polarizing beam splitter 104 and is made incident on the condenser lens 113 while being coaxially aligned with the reflecting light from the optical disc in a state of mutually orthogonally polarized state. The two beams of light made incident on the condenser lens 113 are each reflected and transmitted at a rate of one to one by the non-polarizing half-beam splitter 118. The transmitted beams are passed through a half-wavelength plate 119 so as to turn the direction of polarization by 45°. Then, the beams are separated into horizontally polarized components and vertically polarized components by a polarizing beam splitter 120. The beams thus separated are respectively detected by detectors 121 and 122. The beams reflected by the non-polarizing half-beam splitter 118 pass through a quarter-wavelength plate 123. Then, the beams are separated into horizontally polarized components and vertically polarized components by a polarizing beam splitter 124. The respective beams thus separated are detected by detectors 125 and 126.

A process for obtaining an amplified signal by using the optical interference will be described in detail. The light incident on the condenser lens 113 includes the returning light from the mirror 116 being of the horizontal polarization and the returning light from the optical disc 1 being of the vertical polarization which are coaxially aligned with each other. Accordingly, the state of polarization of the light can be expressed as shown below by the Jones vector.

$$\begin{pmatrix} E_r \\ E_s \end{pmatrix} \quad (1)$$

Here, $E_s$ denotes an electrical field of the returning light from the optical disc and $E_r$ denotes an electrical field of the returning light from the corner cube prism. Meanwhile, a first component of this vector represents the horizontal polarization and a second component thereof represents the vertical polarization.

This light is split into two beams by a non-polarizing beam splitter and the transmitting light passes through a half-wavelength plate of which an axis direction has a fast axis in a direction of 22.5° viewed from the direction of horizontal polarization. Here, the Jones vector can be expressed as follows.

$$\begin{pmatrix} \cos 45° & -\sin 45° \\ \sin 45° & \cos 45° \end{pmatrix} \begin{pmatrix} E_r/\sqrt{2} \\ E_s/\sqrt{2} \end{pmatrix} = \begin{pmatrix} (E_r - E_s)/2 \\ (E_r + E_s)/2 \end{pmatrix} \quad (2)$$

Next, the horizontally polarized components are transmitted and the vertically polarized components are reflected by the polarizing beam splitter. Accordingly, the electrical fields of the transmitting light and the reflecting light are respectively expressed as follows.

$$\frac{1}{2}(E_r - E_s) \quad (3)$$

$$\frac{1}{2}(E_r + E_s) \quad (4)$$

Meanwhile, the light reflected by the non-polarizing beam splitter passed through a quarter-wavelength plate of which an axis direction has a fast axis in a direction of 45° viewed from the direction of horizontal polarization. Here, the Jones vector can be expressed as follows.

$$\frac{1}{\sqrt{2}}\begin{pmatrix} i - \cos 90° & \sin 90° \\ \sin 90° & i + \cos 90° \end{pmatrix} \begin{pmatrix} E_r/\sqrt{2} \\ -E_s/\sqrt{2} \end{pmatrix} = \begin{pmatrix} i(E_r + iE_s)/2 \\ (E_r - iE_s)/2 \end{pmatrix} \quad (5)$$

Next, the horizontally polarized components are transmitted and the vertically polarized components are reflected by the polarizing beam splitter. Accordingly, the electrical fields of the transmitting light and the reflecting light are respectively expressed as follows.

$$\frac{i}{2}(E_r + iE_s) \quad (6)$$

$$\frac{1}{2}(E_r - iE_s) \quad (7)$$

Therefore, detection signals by the four detectors 121, 122, 125, and 126 are expressed by the following formulae (8) to (11), respectively. Here, [eta] denotes light to current conversion efficiency of each detector.

$$\eta \left| \frac{1}{2}(E_r - E_s) \right|^2 = \eta \left( \frac{1}{4}|E_r|^2 + \frac{1}{4}|E_s|^2 - \frac{1}{2}|E_r E_s|\cos\phi \right) \quad (8)$$

$$\eta \left| \frac{1}{2}(E_r + E_s) \right|^2 = \eta \left( \frac{1}{4}|E_r|^2 + \frac{1}{4}|E_s|^2 + \frac{1}{2}|E_r E_s|\cos\phi \right) \quad (9)$$

$$\eta \left| \frac{i}{2}(E_r + iE_s) \right|^2 = \eta \left( \frac{1}{4}|E_r|^2 + \frac{1}{4}|E_s|^2 + \frac{1}{2}|E_r E_s|\sin\phi \right) \quad (10)$$

$$\eta \left| \frac{1}{2}(E_r - iE_s) \right|^2 = \eta \left( \frac{1}{4}|E_r|^2 + \frac{1}{4}|E_s|^2 - \frac{1}{2}|E_r E_s|\sin\phi \right) \quad (11)$$

Therefore, outputs from analog subtractors 130 and 131 are expressed by the following formulae (12) and (13), respectively.

$$|E_r E_s|\cos\phi \quad (12)$$

$$|E_r E_s|\sin\phi \quad (13)$$

Here, $\phi$ denotes a phase difference between the reading light and reference light. It is to be noted that the phase difference between the reference light and the reading light will be hereinafter simply referred to as the phase (while using the code $\phi$) as long as this remark does not cause particular confusion.

As understood from formulae (12) and (13), it is possible to determine the phase difference between the reference light and the reading light from outputs of the two analog subtractors. Accordingly, it is easily understood by those skilled in the art that a phase modulation amount at the time of recording can be reproduced by temporal observation of this phase difference. Here, the phase is recorded as a position of an effective reflecting surface of the micro-hologram. Since this position is read out with the reflecting light, it is naturally understood by those skilled in the art that the phase modulation amount at the time of recording should be recorded as ½ of a phase change amount intended at the time of reading.

Generally, the phase obtained from the output of the analog subtractor is observed together with addition of a phase constant. Such a phase constant can be resolved by a configuration to combine differential coding and a recording format. Accordingly, in the following description, the phase constant will be assumed to be equal to 0 unless otherwise required.

Figure 5:
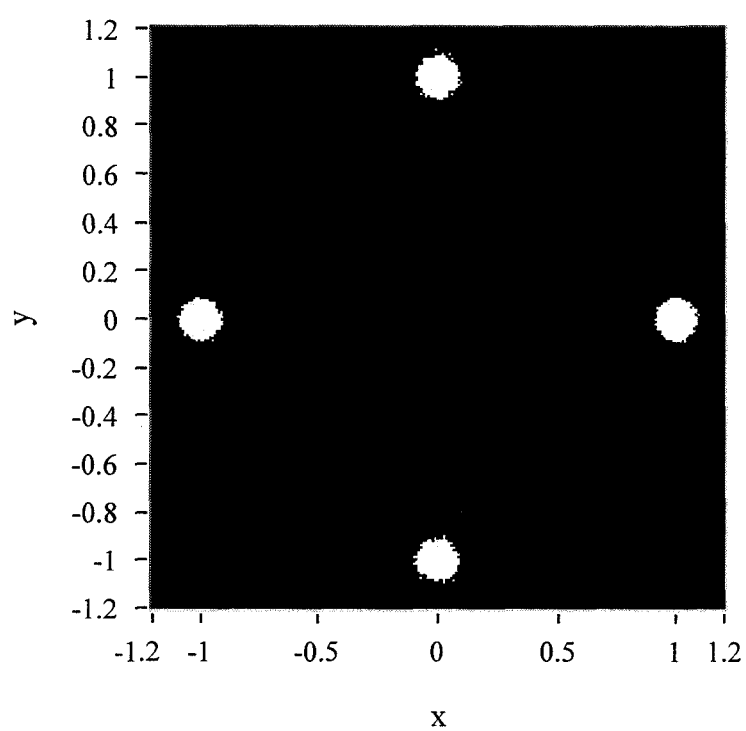
FIG. 5 is a view showing an example of a phase read signal to be observed in a case without an inter-symbol interference.

FIG. 5 shows an example of calculation of the above-described X and Y to be observed at the time of reading (the X and Y will be hereinafter assumed to respectively indicate cosine and sine components of homodyne output unless otherwise noted). Here, four values of 0°, 45°, 90°, and 135° are used as the phases at the time of recording and binary data "00", "01", "10", and "11" are respectively allocated thereto. Doubled phase changes are observed at the time of reading and thus, values corresponding to 0°, 90°, 180°, and 270° are observed as shown in FIG. 5. Therefore, it is possible to decode the user data by determining these phases. Meanwhile, in the example shown in FIG. 5, a sufficiently wide phase transition interval is secured for the recorded phase modulation signals. Hence an intersymbol interference is practically negligible. Specifically, when the phase is changed, such a change is observed as instantaneous transition. Accordingly, the signal seems to be observed only in the vicinity of to 0°, 90°, 180°, and 270° as shown in FIG. 5. Moreover, the amplitude of the read signal is assumed to be constant.

Figure 6A:
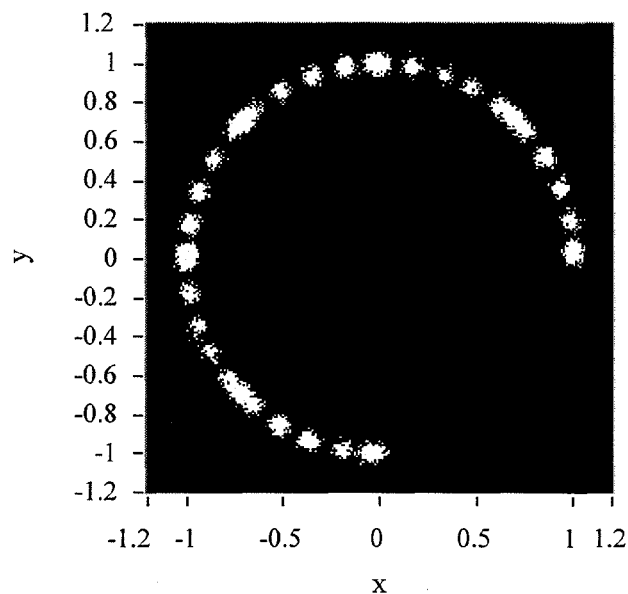
FIG. 6A is a view showing an example of a phase read signal to be observed when the inter-symbol interference has a limit.

An intersymbol interference also occurs when optically reading the phase recorded on the micro-holograms because of the fact that the size of an optical spot is limited. In this case as well, it is possible to regard the intersymbol interference to be similar to an intersymbol interference that occurs in a conventional optical disc on which shade marks are recorded for example. Specifically, if a read optical spot includes a region on which a different phase is recorded, the phase (the phase difference from the reference light) observed by use of the homodyne detection can be regarded as a phase value obtained through weighted average using reflecting light amounts from the respective phase regions. FIG. 6A shows a calculation example of the phases to be observed in the case of presence of an intersymbol interference by using this concept. This example represents the case of reading random four-level phase modulation signals (without run-length limitation), which are recorded at a symbol interval of 320 nm by using the micro-hologram, by using a laser beam having a wavelength of 405 nm and an objective lens having the NA of 0.85. This is obviously different from FIG. 5 where the intersymbol interference is negligible. Specifically, the values other than those at the vicinities of the points corresponding to 0°, 90°, 180°, and 270° are observed whereas no values are observed within a range from 270° to 360°. This is only natural when considering an influence of the above-described intersymbol interference. Here, spots observed in spaces between the respective points corresponding to 0°, 90°, 180°, and 270° emerge in FIG. 6A because the data used for drawing FIG. 6A are time discrete data (double over sampling) of the phase output. If the data are formed of continuous signals, then a three-quarter arc is observed.

Figure 6B:
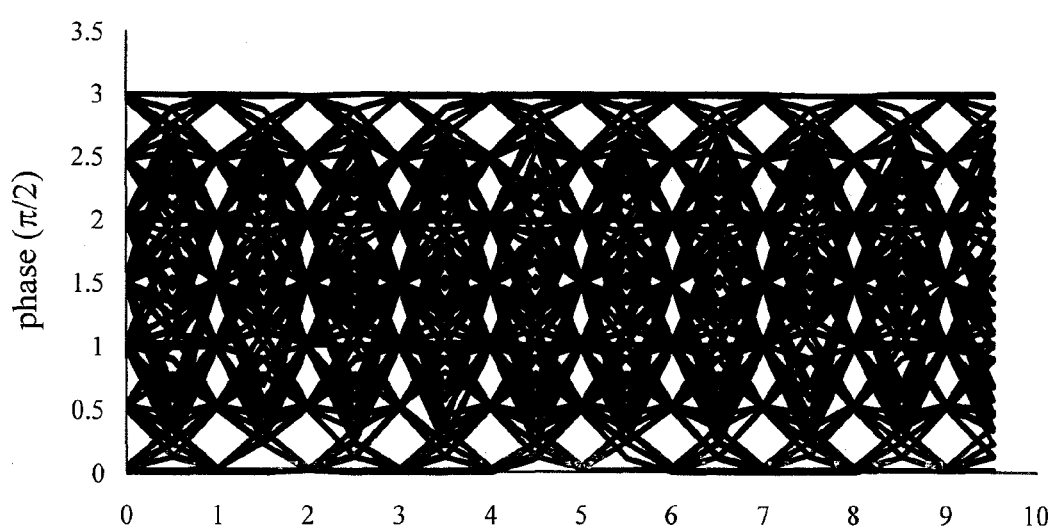
FIG. 6B is a view showing an example of an eye pattern of the phase read signal to be observed when the inter-symbol interference has the limit.

FIG. 6B is obtained by drawing the same data as an eye pattern while defining the phase along the vertical axis. Apparently there are numerous phases where many lines intersect with one another. These phases correspond to the spots that are observed in the spaces between the respective points corresponding to 0°, 90°, 180°, and 270° in FIG. 6A. Moreover, it is also apparent that there is a line passing through a point near the center of the eye in any of phase levels. This shows that it is impossible to discriminate the codes by way of simple level determination.

As similar to the case of binary data, a PRML (partial response most-likely) method is effective for decoding the original four-level data sequence from the signal receiving the intersymbol interference. Decoding by using the PRML method is widely known to those skilled in the art and is therefore not described in detail. Unlike the PRML decoding applicable to the conventional optical disc, a Viterbi decoder configured to use multilevel signals at the time of PRML decoding involves a drastically larger number of internal states required for discriminating the necessary number of values as compared to the case of binary signals. Assuming that there are no run-length limitations, the number of internal states N of the Viterbi decoder compatible with n-level recording will be given by the following expression where the constraint length is L.

$$N = n^{(L-1)} \quad (14)$$

That is to say, when the constraint length is 3 in the case of binary recording, then the number of internal states of the Viterbi decoder is $2^2=4$. On the other hand, the number of internal states is equal to 16 in the case of 4-level recording. Likewise, the number of internal states in equal to 64 in the case of 8-level recording or equal to 256 in the case of 16-level recording. Meanwhile, when the constraint length is 4, the number of internal states is equal to 8 in the case of binary recording, 64 in the case of 4-level recording, 512 in the case of 8-level recording, and 4096 in the case of 16-level recording. It is understood that the number of internal states of the Viterbi decoder sharply increases along with the increase in the recorded values or the constraint length. Moreover, the number of branches to be branched off from the each condition is equal to the number of the recorded values. As a consequence, the number of circuits M required for calculating branch metric is given by the following expression.

$$M = n^L \quad (15)$$

If it is presumably difficult to reduce a symbol error rate of a result of PRML decoding to an adequately low level, a conceivable option is to code the user data in advance so as to enhance reliability. A convolution code can be used for this coding operation. In this case, it is possible to decode the convolution code along with a PRML decoding in the Viterbi decoder. However, this increases the number of internal states, i.e., the circuit scale of the Viterbi decoder.

From the above it is understood that one of problems when decoding the multilevel-recorded signal is how to regulate the circuit scale.

The information recording and reading apparatus of the present invention includes a means for obtaining the phase $\phi$ from the X and Y outputs from the homodyne system, a FIR (finite impulse response) type adaptive equalizer, and a Viterbi decoder capable of determining a value exceeding a binary value. In addition, the device may further include a Viterbi decoder capable of decoding the convolution code. Moreover, the device may further include a de-interleaver.

The optical phase is modulated by using the user data. The phase information is recorded on the recording medium and then the phase information recorded on the recording medium is optically read out. The recorded phase information is converted into an electric signal and the signal is adaptively equalized and then subjected to PRML decoding. Moreover, the user data pieces are interleaved beforehand after the convolution and the user data are recorded, read, and subjected to PRML decoding. Thereafter, the user data are restored by de-interleaving the result of PRML decoding and then subjecting the result to Viterbi decoding. Meanwhile, a shift in a direction of a time axis direction relative to a target wave of a designated pattern is detected from the read phase information so as to calculate a statistical average. In the meantime, values of the phases read out of a designated pattern are extracted from the read phase information so as to calculate a statistical average. The read signal is evaluated by using these statistical averages.

Figure 1:
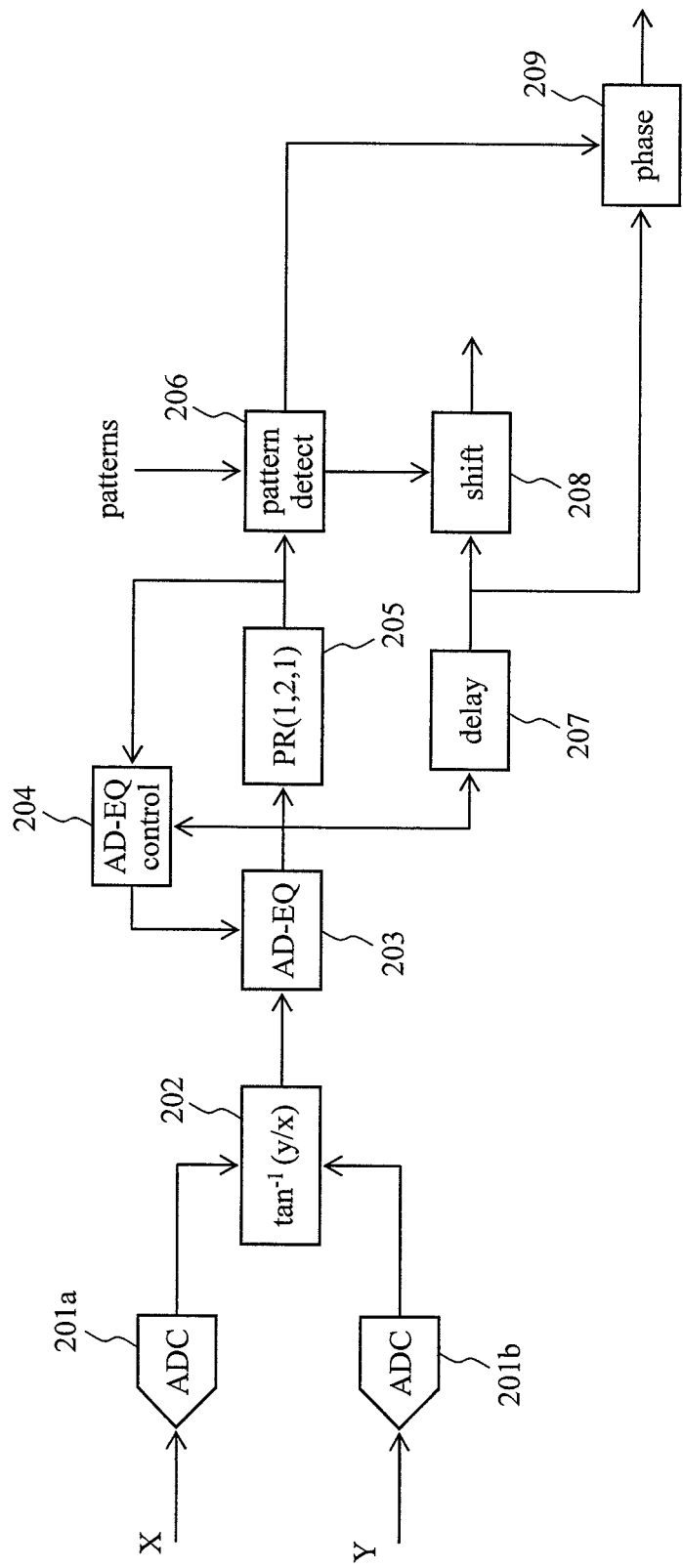
FIG. 1 is a functional block diagram showing a device configuration example of the present invention.

FIG. 1 shows a device configuration example of the present invention together with a signal flow. This example is intended for reading a micro-hologram that records random 8-level phase modulation signals (without run-length limitation) by use of the homodyne detection system and for evaluating a recording state thereof. Evaluation items in terms of the recording state include the phase and the edge shift. Now, the necessity for evaluating the phase in particular will be described.

At the time of recording, the phase of the recording light is modulated with the phase modulator based on the data to be recorded. In this case, it is desirable to perform the phase modulation as instructed by the phase modulator and to form the interference fringe in the micro-hologram in the recording medium as intended. However, there may be a case where it is not possible to perform the phase modulation as intended due to a change in an environment such as the temperature or due to a temporal change of characteristics of the phase modulator. Meanwhile, even when the phase of the recording light is successfully modulated as intended, the medium may shrink as a result of recoding the micro-hologram. As a consequence, there is a risk of a failure to locate the position of the recorded interference fringe as intended. Such a situation may vary depending on the recording medium, the power applied at the time of recording, and so forth. Accordingly, it is not always possible to record the phase as intended. These problems may cause reduction in the margin such as disc tilting at the time of reading or reduction in compatibility among drives. Meanwhile, in terms of the time axis direction, it is not always possible to obtain a signal that changes the phase at intended timing during a reading operation because of a frequency characteristic of the phase modulator or a characteristic of the medium, for example. These are similar in the case of the conventional optical disc.

It is particularly important for the optical disc to ensure compatibility among the drives. Accordingly, it is necessary to read the data after recording and to evaluate the recording state. The conventional optical disc has been evaluated mainly based on the error rate and the jitter. Since the conventional optical disc is subjected to binary recording, it is easy to define a zero level of the read signal. Moreover, it is also easy to define the jitter that represents fluctuation of the time when the read signal crosses this 0 level. Further, since the jitter is correlated with a frequency of occurrence of random errors, it is reasonable to use these values as evaluation indexes. In addition, since the jitter can be reduced by reducing the edge shift, it is possible to use these values as evaluation indexes for recording conditions.

Figure 7A:
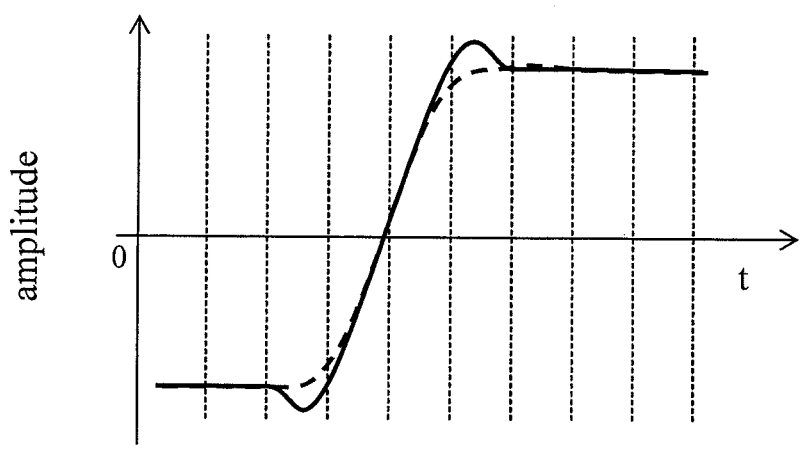
FIG. 7A is a view showing an example of a read wave in binary recording.

On the other hand, in the phase recording, it is necessary to evaluate the phase (the vertical axis) in addition to evaluation in the time axis direction (the horizontal axis) such as the jitter. An example of the reason will be described by using FIG. 7A and FIG. 7B. FIG. 7A is a schematic diagram showing a read wave (a solid line) having asymmetry and a read wave (a dashed line) without the asymmetry in the conventional binary recording, which represent portions in near edges. As it can be estimated from FIG. 7A, if the inclinations of the waves in the vicinity of the edges, i.e., a point of intersection with the 0 level are the same, then fluctuation of the edges attributable to noise is also similar regardless of whether or not the waves include symmetry. That is, the jitters are almost the same in both cases. As a matter of fact, the error rates obtained from any of the waves are not much different unless the asymmetry is extremely evident. In addition, it is also possible to understand the fact that influences of the edge shift are similar in both cases. In short, it is understood that an absolute value in terms of the vertical axis (signal amplitude) of the read signal is not an important factor.

Figure 7B:
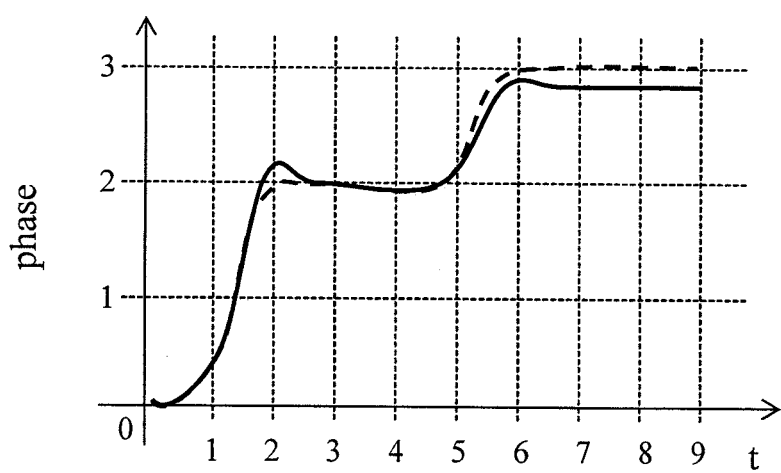
FIG. 7B is a view showing an example of a read wave in multilevel recording.

In the case of multilevel recording and reading such as phase recording, the absolute value in terms of the vertical axis of the read signal has a similar importance to that of the horizontal axis (time). An example representing this fact will be described with reference to FIG. 7B. While the vertical axis in FIG. 7B indicates the phase, the following explanation also applies to a system where the vertical axis indicates another physical amount. In FIG. 7B, a dashed line depicts a wave obtained by reading a recording medium that records the phase almost correctly. On the other hand, a solid line in FIG. 7B depicts a wave obtained by reading a recording medium that records the phase partially incorrectly (time points 6 to 9). The phase of 270° is supposed to be recorded in this range. However, a slightly smaller phase is actually recorded. As a result, there is a higher incidence of erroneous discrimination as 180° when reading. Thus, it is apparent that the phase needs to be recorded as intended in the phase multilevel recording. Meanwhile, there is also a necessity to change the phase at the intended timing in terms of the time axis direction. However, the detailed description will be omitted because this is similar to the case of the conventional optical disc. Note that the shift between the timing of the observed phase change and the intended timing will be referred as the edge shift in the case of the multilevel recording as well.

Therefore, in order to ensure sufficient compatibility, it is necessary to provide a means for confirming that the wave is changed to the intended phase value at the intended timing after recording. An example of such a means will now be described.

In FIG. 1, the outputs X and Y from the homodyne detection system are converted into the digital signals by AD (analog to digital) converters 201a and 201b, respectively. An argument calculator 202 calculates an argument corresponding to a point (X, Y) on an X-Y plane by using these values. The argument calculator 202 is a circuit obtained by embodying series expansion of an arctangent function. The argument thus obtained is equalized by an adaptive equalizer 203 and is then inputted to a PRML decoder 205, and thereby being decoded in accordance with the PRML method. The PR-class of this PRML decoder is defined as PR (1, 2, 1) ML. That is, the constraint length is equal to 3. Moreover, this PRML decoder complies with decoding of 8-level phase modulation codes. Hence the number of internal states is 64.

The adaptive equalizer 203 is a FIR (filter impulse response) type equalizer having the number of taps equal to 15. Tap coefficients thereof are determined by use of a LMS (least mean square) method. A decoding result by the PRML decoder is supplied to an adaptive equalizer coefficient controller 204. The adaptive equalizer coefficient controller 204 synthesizes a target wave corresponding to the PR (1, 2, 1) ML by using this decoded result. The output from the adaptive equalize is also supplied to the adaptive equalizer coefficient controller 204. The adaptive equalizer coefficient controller 204 compares the target wave with the output from the adaptive equalizer while considering a delay (latency) caused during the PRML decoding, and thereby obtains an equalizing error. Then, the adaptive equalizer coefficient controller 204 updates the tap coefficients of the adaptive equalizer 203 based on the LMS method. The LMS method is widely known to those skilled in the art and any further description of the method will be omitted herein.

A pattern detector 206 searches for a predetermined pattern from the decoding result of the PRML decoder. The pattern detector 206 may search for multiple types of patterns at the same time by attaching identification numbers to the patterns and storing the patterns. Details of the patterns to be searched will be described later. Upon detection of a target pattern, the pattern detector 206 outputs an identification number thereof to a shift evaluator 208 or a phase evaluator 209. Here, a pattern targeted at calculation of the shift is usually different from a pattern targeted at calculation of the phase. Accordingly, the pattern detector also determines these patterns and outputs the patterns to corresponding destinations.

The output from the adaptive equalizer 203 is supplied to the phase evaluator 209 via a delay unit 207. The delay unit 207 adjusts delays in PRML decoding and pattern detection in such a manner that timing of target pattern detection notification that the phase evaluator 209 receives from the pattern detector 206 matches with a data sequence corresponding to such a pattern to be outputted from the adaptive equalizer.

Figure 8:
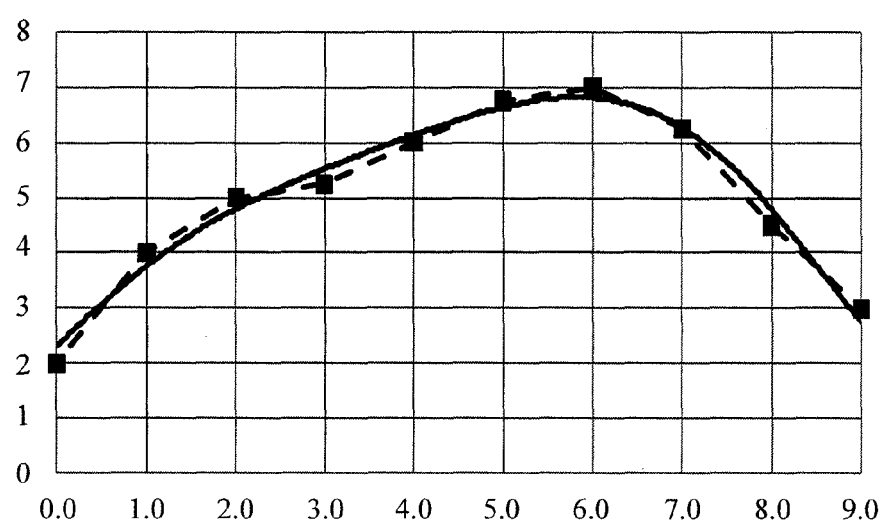
FIG. 8 is a view showing an example of a read wave and a target wave.

Next, details of phase calculation will be described. Here, a detection pattern to be used will be described by using an example of the read wave and the target wave shown in FIG. 8. In FIG. 8, the horizontal axis indicates the time on the channel clock basis. The vertical axis indicates the phase from 0° to 360°. Here, each grid represents 45°. The recorded phase values are indicated below the time scale along the horizontal axis. The values also apply the unit based on 45°. The target wave of the PR (1, 2, 1) ML corresponding thereto is indicated with a dashed line. Meanwhile, a solid line represents the read wave.

Since there is the intersymbol interference, it is not easy to judge whether or not the phase is correctly recorded in a given pattern. Moreover, a pattern including a fast phase change is susceptible to aberration of an optical system or to a focus error at the time of reading. In other words, it is reasonable to use a pattern including a slow phase change. In the meantime, the constraint length of the PR-class (PR (1, 2, 1) ML) of the decoder is equal to 3. Accordingly, when the same phase value continues for three clocks or longer, the target wave shows a full-response. Hence the read wave is also expected to return a full-response. As a consequence, it is only necessary to acquire the values of the read wave corresponding to the time when the target wave shows the full-response. Therefore, a detection target pattern is determined as a pattern having the same phase value continuously for three clocks or longer in this case.

Figure 9:
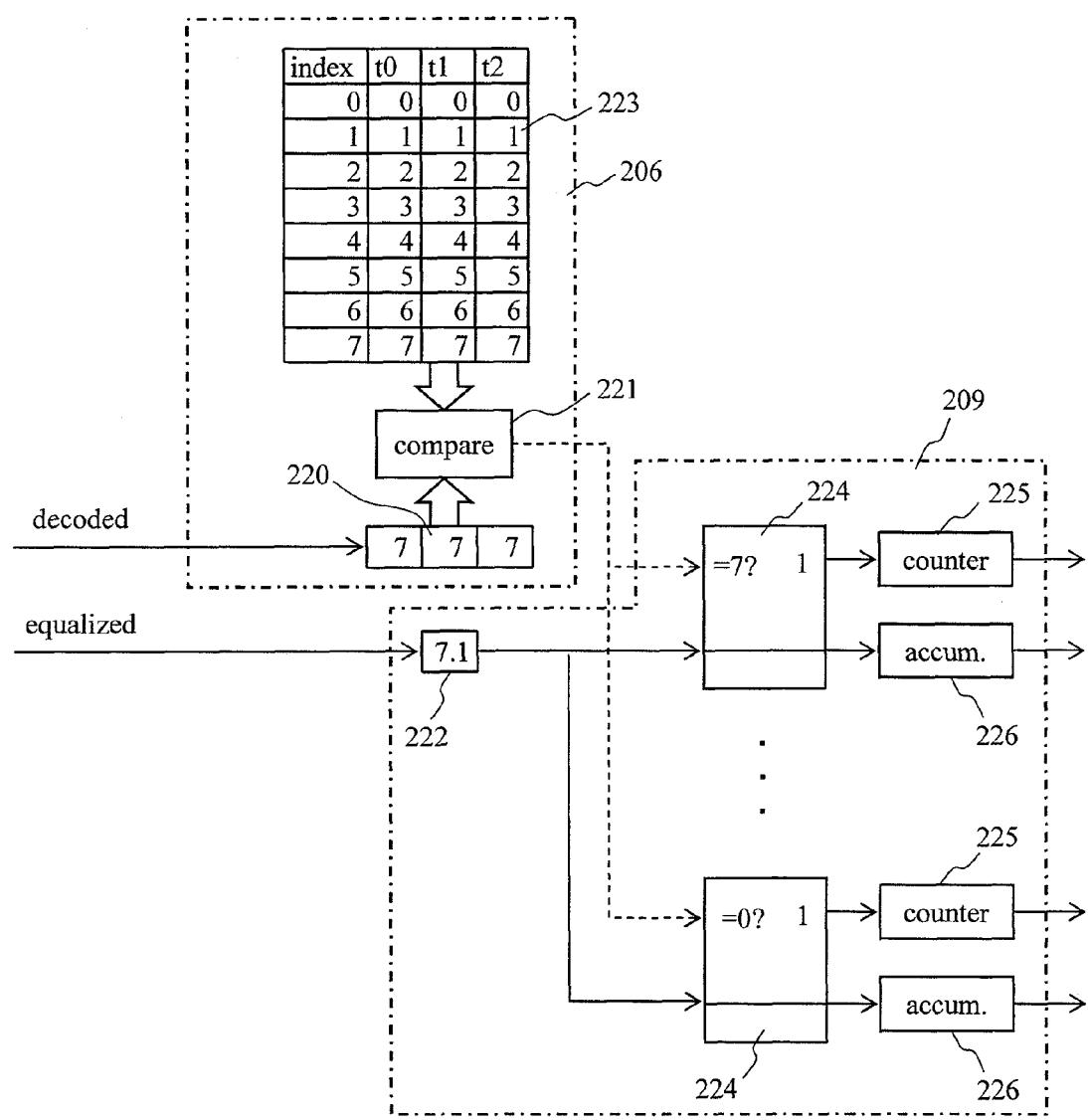
FIG. 9 is a view for explaining details of phase calculation.

FIG. 9 explains details of phase calculation. A detection target pattern table 223 stores the detection target patterns as described previously. Meanwhile, as described above, the pattern having the same phase value continuously for three clocks or longer is defined as the detection target. Therefore, eight types of the patterns including the same three consecutive values such as '000' or '111' in a range from 0 to 7, are stored in the table. Here, there is a possibility that a pattern such as '012' or '765' is applicable as the case may be. Hence the phase evaluator 209 has an internal configuration as shown in FIG. 9.

The result of decoding by the PRML decoder 205 is inputted to a decoded pattern register 220. The decoded pattern register 220 is a shift register having a length of 3, which compares the values equivalent to three clocks stored therein with the values in the detection target pattern table 223 by using a pattern comparator 221. When the pattern comparator 221 discovers a detection target pattern, the pattern comparator 221 notifies the phase evaluator 209 of the identification number of the detection target pattern. In the phase evaluator 209, this identification number is inputted to a selector 224. Here, multiple selectors are prepared so as to correspond to the identification numbers, and the identification numbers are respectively set to the selectors. If one of the identification numbers is notified and the value corresponds to the value preset to one of the selectors, the selector outputs a pulse to a counter 225 provided on each selector so as to increment a value in the counter by 1. At the same time, a phase value retained in a register 222 is sent to an integrator 226 which is provided on each selector similarly. Upon receipt of the value from the register, the integrator 226 adds the value to a current value held in the integrator 226. An average value of the targeted phase can be obtained from the value in the counter 225 and the value in the integrator 226.

The reading and decoding system shown in FIG. 1 obtains the phase (the argument) from the values X and Y and performs linear equalization of the values by using the adaptive equalizer. There may be a case where it is not possible to obtain the correct phase of the read signal with this configuration only. For example, there may be a case when driving voltage for the phase modulation has an anomaly at the time of recording whereby it is only possible to modulate to a smaller phase than a targeted value in proportion to an instructed value. In such a case, a read phase wave is formed into a downsized wave as a whole. If adaptive equalization is applied to such a wave, the equalizer functions as a frequency filter and as a magnifier at the same time, thereby expanding the scaling of the downsized wave to almost an appropriate value. As a result, it is not possible to detect the anomaly at the time of recording.

Figure 10:
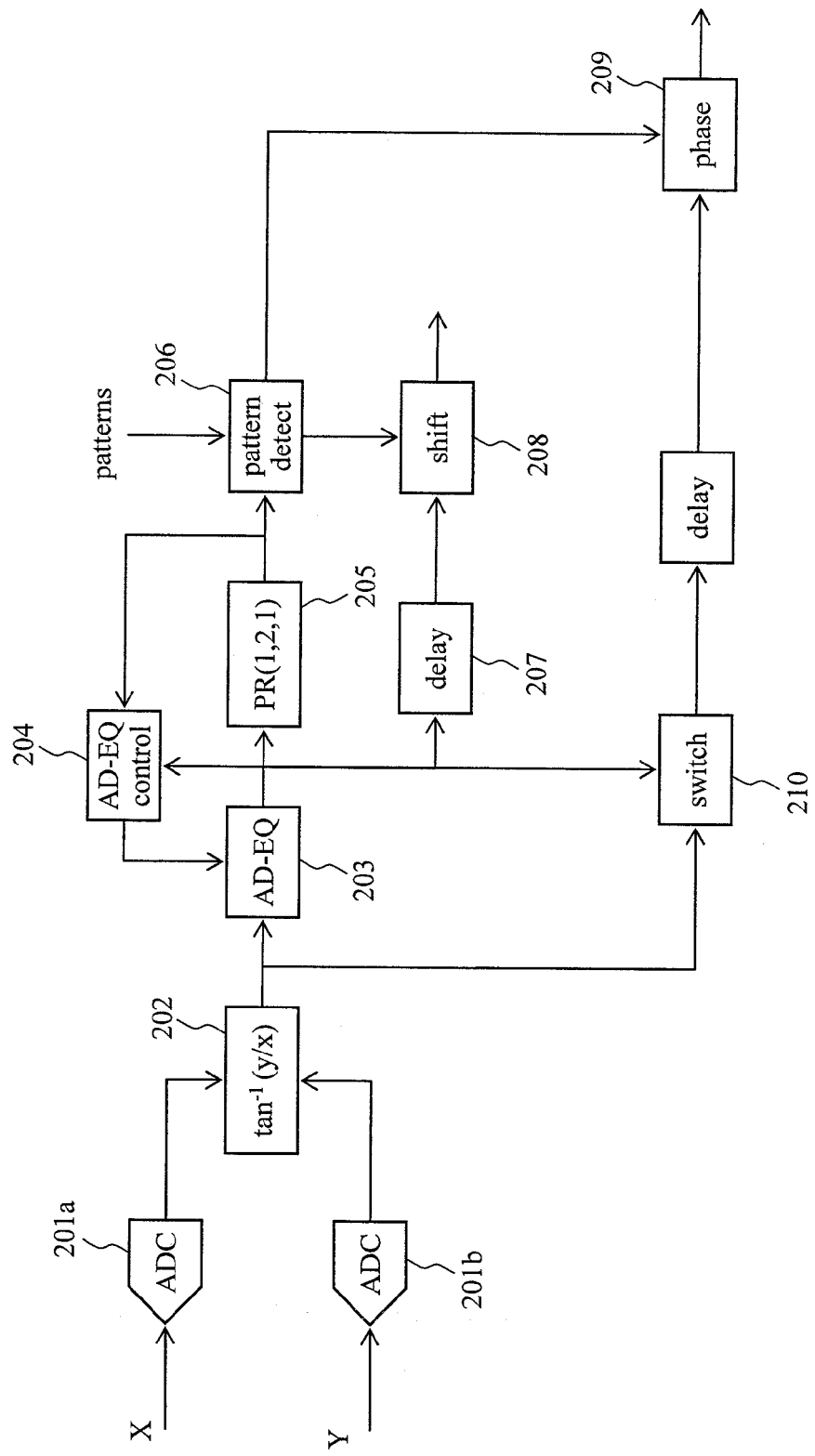
FIG. 10 is a functional block diagram showing a configuration example of a phase calculation system which can deal with a scale anomaly of a modulator.

A conceivable option to prevent such a phenomenon is to measure the phase by using the wave before the adaptive equalization. However, the frequency characteristic is not corrected in this case. Accordingly, optical spots may be distorted at the time of reading. Therefore, in an example shown in FIG. 10, a switcher 210 is added to the configuration of FIG. 1 so as to be able to select the wave before equalization or the wave after equalization when appropriate. Specifically, it is possible to check presence of the above-mentioned anomaly by measuring minimum and maximum values of the phase by using the wave before equalization. In that case, it is possible to reduce an influence of the frequency characteristic by selecting a pattern having the value that continues for a longer period than the constraint length of the PRML decoder.

The edge shift can be detected by using a method similar to the technique disclosed in Patent Document 4. Therefore, the technique concerning the edge shift will be briefly described herein. According to Patent Document 4, by selecting a combination (T, L, R) of an appropriate pattern relative to a read edge wave (indicated as W) targeted for evaluation, it is possible to obtain an extended edge shift D representing an amount corresponding to the edge shift while using the following expressions. Here, a Euclidian distance between any two points out of W, T, R, and L will be expressed as ED (L, W), ED (T, L), and so forth.

$$xL = \frac{1}{2}\left(1 - \frac{ED(L, W) - ED(T, W)}{ED(T, L)}\right) \quad (16)$$

$$xR = \frac{1}{2}\left(1 - \frac{ED(R, W) - ED(T, W)}{ED(T, R)}\right) \quad (17)$$

$$D = \frac{xR - xL}{2} \quad (18)$$

Figure 11:
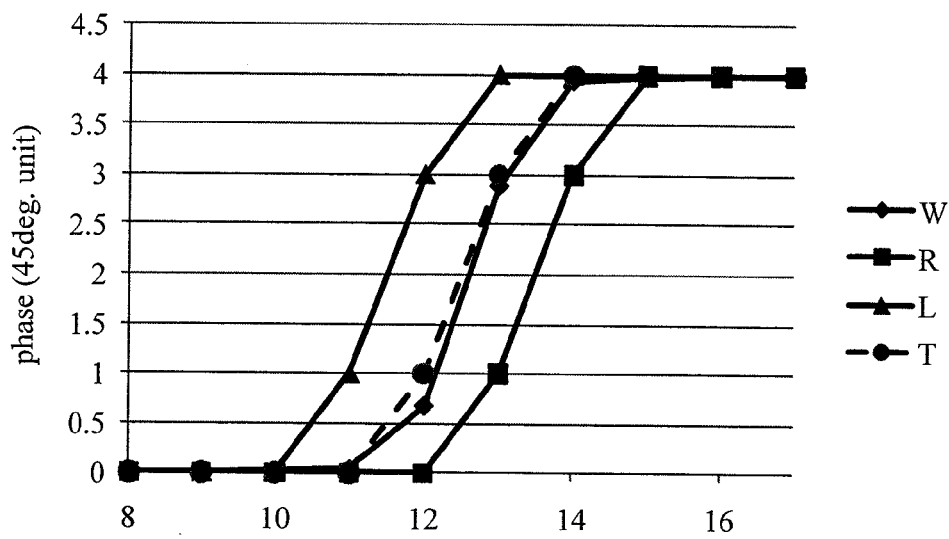
FIG. 11 is a view for explaining an example of edge-shift detection.

Patent Document 4 includes the description based on binary recording. In reality, these formulaic expressions are also applicable to multilevel recording. This is because the second terms in formulae (16) and (17) are normalized by the Euclidian distance. As an example, a case of transition of the phase from 0 (0°) to 4 will be described with reference to FIG. 11. FIG. 11 shows results of sampling based on the channel clock on a read wave from which W is obtained. An edge is located between time points 12 and 13, or namely, in a position deviated by 12% toward a positive side of the time. For this reason, the edge is slightly deviated from a target wave T. Lines R and L respectively represents the edges obtained by shifting T to a positive side and a negative side in an amount equivalent to one time point. An expanded edge shift turns out to be 0.11 when using these lines. Hence an amount substantially corresponding to the given edge shift is obtained as a consequence.

Figure 12:
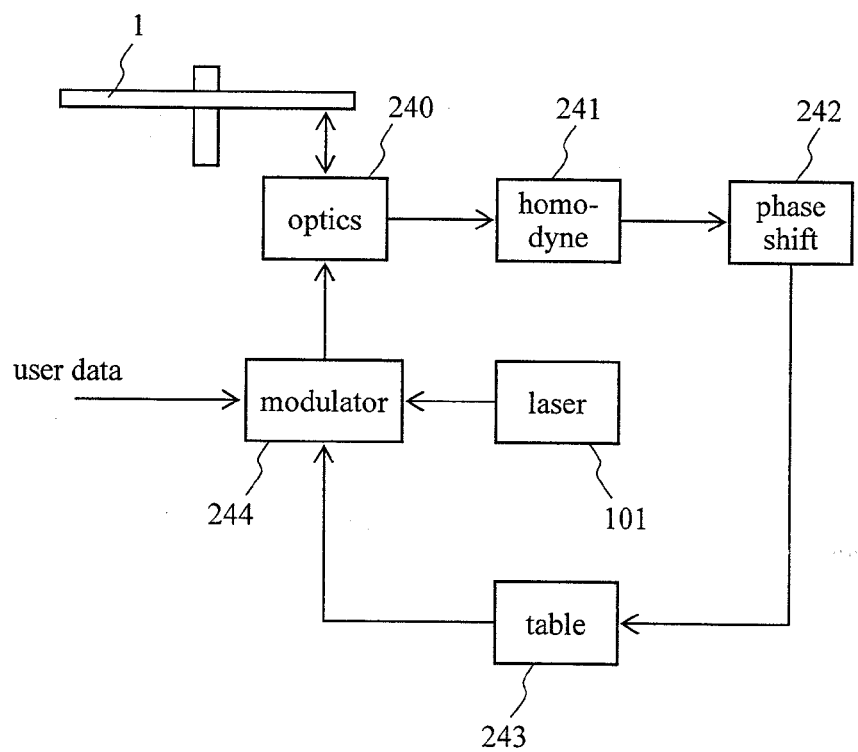
FIG. 12 is a functional block diagram for explaining a flow of data at the time of recording adjustment.

As similar to the conventional optical disc system, the values of the phase and the edge shift obtained as described above can be used not only for assuring the compatibility. Specifically, it is also possible to improve recording quality by feeding these values back to recording procedures including a writing test. An example of a mechanism for such improvement is shown in FIG. 12. Meanwhile, FIG. 13 shows an example of the procedures.

FIG. 12 is a view for explaining how the values of the phase and the edge shift obtained as described above are used. This drawing mainly explains a data flow. For this reason, an optical system and various mechanical systems are omitted as much as possible. Accordingly, the following description will be focused on the data flow. At the time of recording, a phase modulator 244 modulates the phase of the laser beam emitted from the semiconductor laser 101 being the light source based on the user data. In this case, the phase modulator 244 adjusts the phase modulation amount and the timing based on the information stored in a compensation table 243 instead of simple modulation based on the user data serving as the instructed value. The data are recorded through an optical system 240 by using the modulated light.

Contents of the compensation table are determined based on the phase and the edge shift obtained as described above. Specifically, the recorded phase information is optically read out through the optical system 240 and is taken out as an electric phase signal by using a homodyne detection system 241. The phase information thus taken out is then checked against the target wave by a phase edge shift detection system 242 (corresponding to FIG. 1). Hence the phase and the edge shift are extracted.

Figure 13:
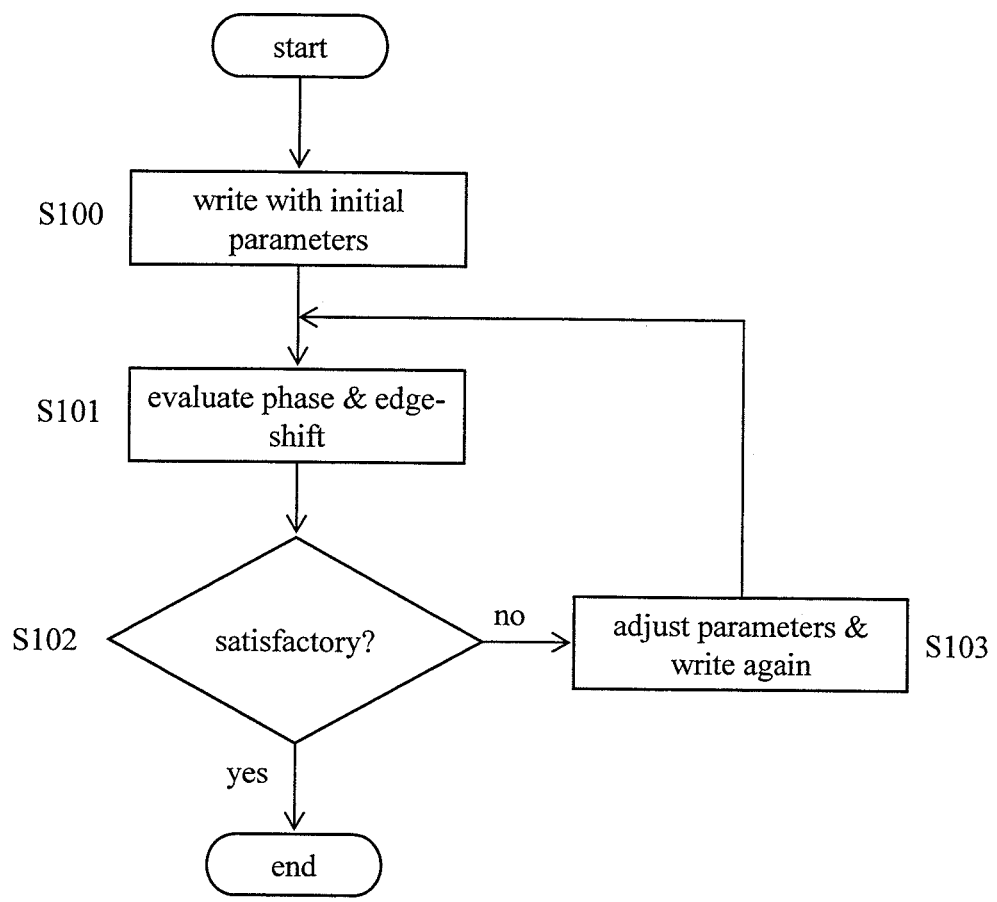
FIG. 13 is a view showing an example of procedures the recording adjustment.

Write compensation is carried out as shown in FIG. 13, for example. When recording on the disc for the first time, recording is performed by use of predetermined recording parameters (compensation values for the phase and the edge) as shown in step 100. Here, recording power and other parameters are assumed to be completed in advance. In step 101, the phase value and the edge shift are derived from a result of this recording step by using the means and the method described previously. Next, the values thus derived are investigated to judge whether or not these values fall within predetermined ranges (step 102). Here, if the values fall within the predetermined ranges, then the write compensation is completed as it is not necessary to adjust the recording parameters. If there is any parameter does not fall within the predetermined range, the process goes to step 103 in which a value in the position corresponding to the relevant parameter on the compensation table is corrected and then recording is performed again by using the corrected value. Then the process goes back to step 101. This flow is repeated until all the condition defined in step 102 is satisfied.

When recording the multilevel data as the phase modulation signal, it is possible to reduce an error rate at the time of decoding by means of convolving the user data and then recording the multilevel data. A conventional system of this type is generally configured to employ a decoding method designed to resolve the intersymbol interference and the convolution simultaneously at the time of decoding. However, when constructing the decoder based on this mode in this case, the number of internal states of the decoder becomes enormous. For example, when using the coder having the constraint length of 7 shown in FIG. 15, the number of states necessary for coding and decoding turns out to be $2^{7-1}=64$. Meanwhile, if the constraint length of PRML decoding necessary for resolving the intersymbol interference is set to 3, then the number of states required for this situation becomes equal to 64 in this case as well. The number of states that are likely to appear is equivalent to total combinations of these values, which turns out to be $64^2=4096$ assuming that there is no limitation of the run-length. The Viterbi decoder for dealing with such a huge number of internal states requires enormous circuit scale and is barely feasible.

Figure 14:
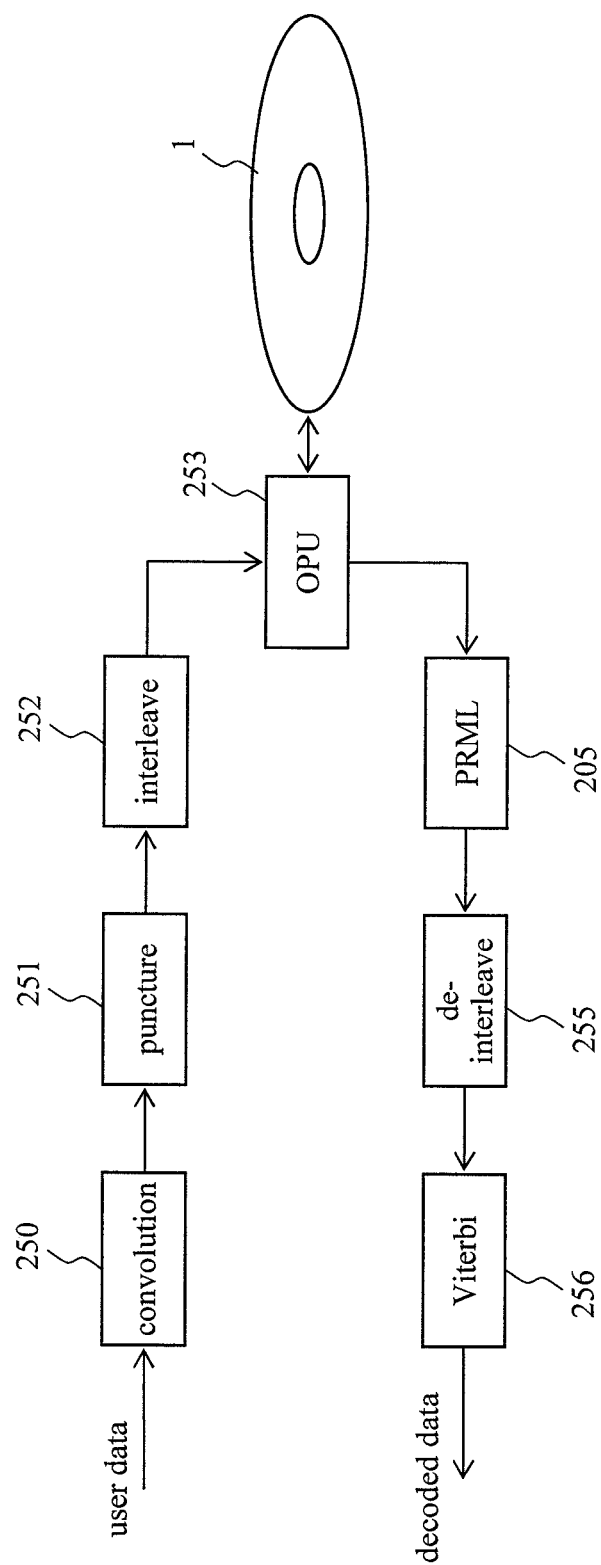
FIG. 14 is a view for explaining a flow of signal processing when using convolution concurrently.
Figure 15:
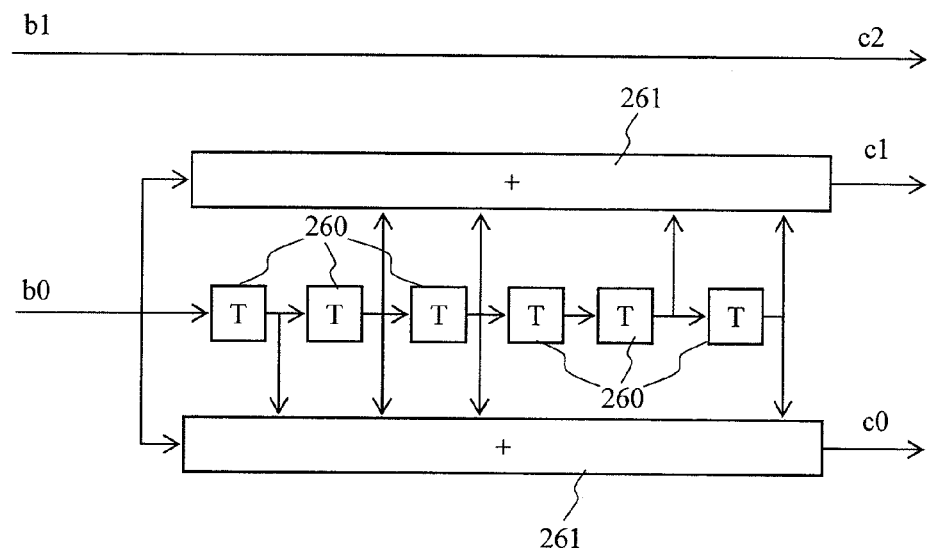
FIG. 15 is a view showing an example of a configuration of a convolver.

To solve this problem, the present invention is designed to resolve the intersymbol interference and to decode the convolved code by using different respective decoders. Accordingly, it is possible to ensure sufficient decoding performances just by using two Viterbi decoders each having the number of internal states of 64. The total circuit scale combining the two decoders is just about 1/170 in size as compared to the decoder configured to resolve the intersymbol interference and the convolution code at the same time. FIG. 14 shows a flow of data processing in the recording and reading processes. First, the user data are convolved by use of a convolver 250. The configuration of the convolver is shown in FIG. 15. Reference codes b0 and b1 denote user bits while reference codes c0, c1, and c2 denote coded data. A shift register having the length of 7 is constructed by using six tiers of unity delay units 260. The data c1 is obtained by delaying the bits b0 and b1 at the time points of 2, 3, 5, and 6 and then adding the values with a binary adder 261. Meanwhile, the data c0 is obtained by delaying the bits b0 and b1 at the time points of 1, 2, 3, and 6 and then adding the values with the binary adder 261. Note that the bit b1 is directly defined as the data c2 without coding.

After the convolution, some of bits are regularly taken out with a puncture unit 251 in order to adjust a coding ratio. Next, the data are subjected to interleaving with an interleaver 252 and then recorded on the optical disc 1 via an optical head 253. When reading, the phase information read by means of homodyne detection using the optical head 253 is decoded by the PRML decoder 205. Since this decoding result is interleaved, the data are restored to the original sequence by using a de-interleaver 255. An output from the de-interleaver 255 is supplied to a Viterbi decoder 256 so as to decode the convolved code. Naturally, the output from the PRML decoder 205 may contain errors. However, since the user data have been subjected to convolution, most of the errors are corrected in the process of Viterbi decoding.

Figure 16:
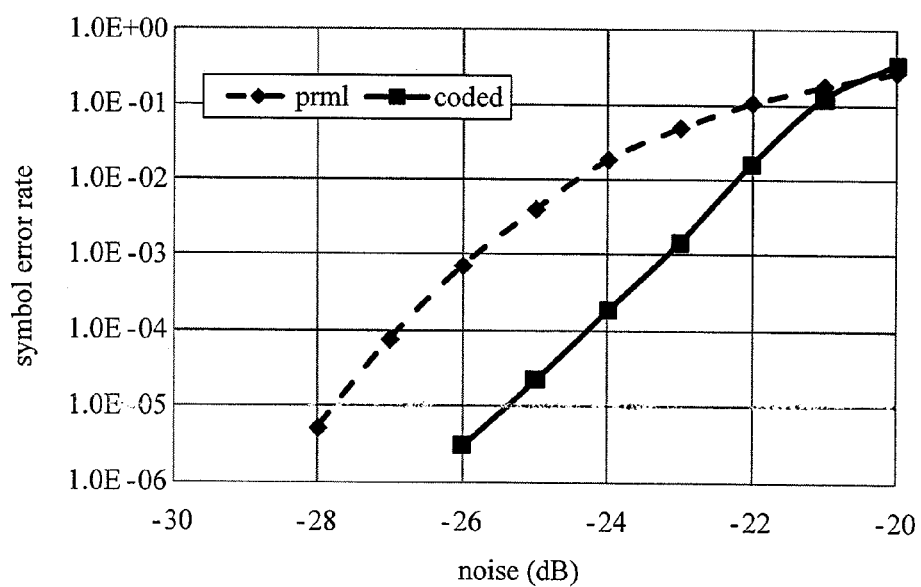
FIG. 16 is a view of an example of an effect of convolution.

FIG. 16 shows a graph showing effects of convolution and Viterbi decoding. This graph represents a result of calculation when the data coded by using the coder shown in FIG. 15 decodes phase information which is recorded at a symbol interval of 280 nm. The horizontal axis indicates noise amplitude relative to the phase wave while the vertical axis indicates a symbol error rate. Note that the symbol stated herein indicates the 2-bit set (b0, b1) of the user data before coding and indicates the coded 3-bit set (c0, c1, c2) after coding. Moreover, no puncturing is carried out in this case. In this graph, a curve indicated with a dashed line represents a symbol error rate of the output from the PRML decoder and a solid line represents a symbol error rate of the output from the Viterbi decoder. The graph shows that there is a gain of about 2.8 dB at the maximum as a result of convolution. However, this value is supposed to be smaller depending on a puncture rate because no puncturing is carried out at this point.

Here, it is also possible to carry out modulation for limiting the run-length after interleaving and then to carry out demodulation corresponding thereto after PRML decoding. In this way, the linear recording density may be further enhanced in some cases.

Figure 17:
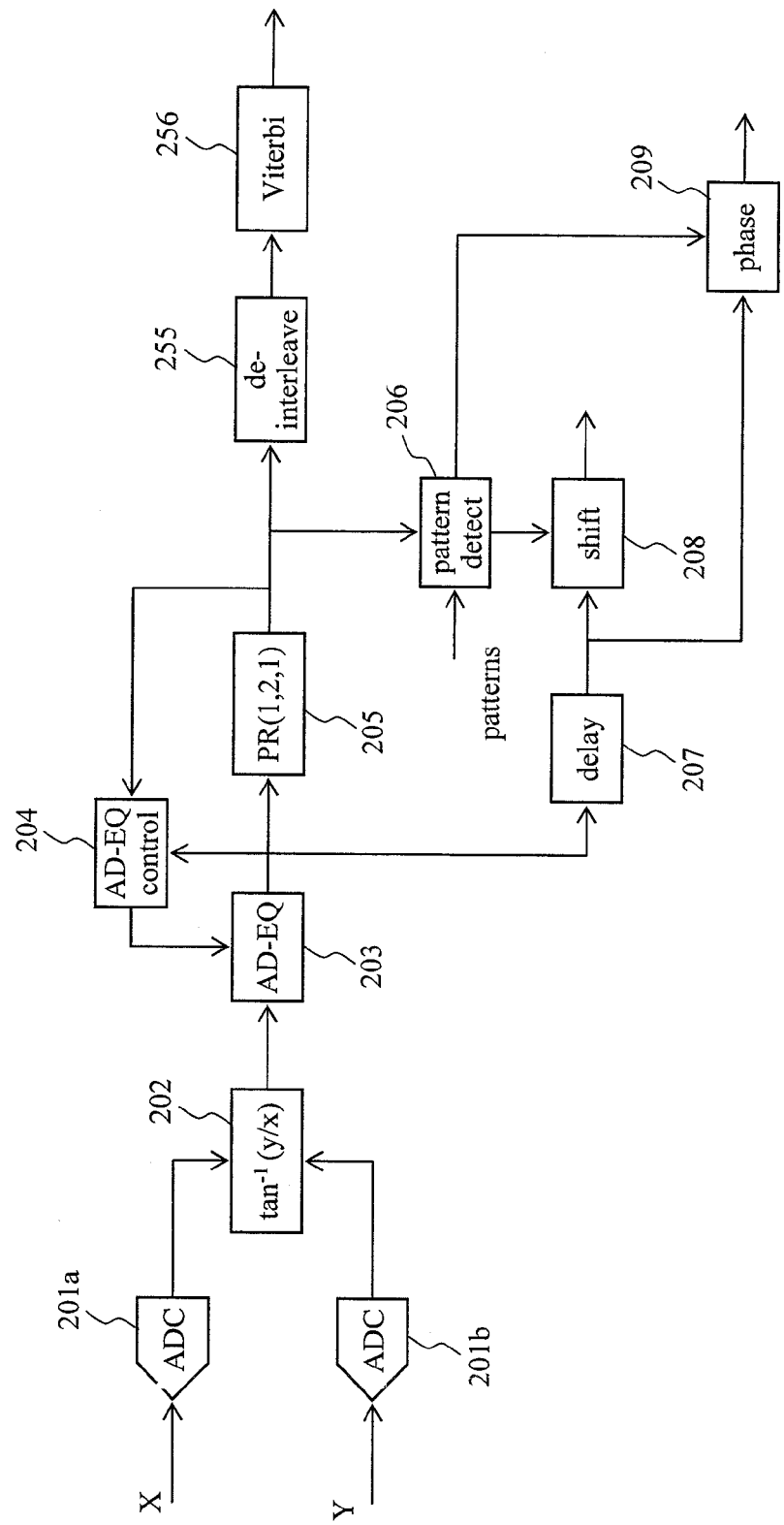
FIG. 17 is a functional block diagram showing a configuration example of a decoding system when using convolution concurrently.

FIG. 17 shows details of the decoding system in FIG. 14. This construction can be realized by adding the de-interleaver 255 and the Viterbi decoder 256 to the construction shown in FIG. 1. Therefore, this construction is advantageous not only from the viewpoint of the circuit scale of the decoder but also because it is possible to realize adaptive equalization easily. On the other hand, in the case of the decoder configured to resolve the intersymbol interference and the convolution at the same time, information necessary for forming the target wave for the adaptive equalizer is not apparently present inside the decoder. Hence it is not easy to realize the adaptive equalization.

Figure 18:
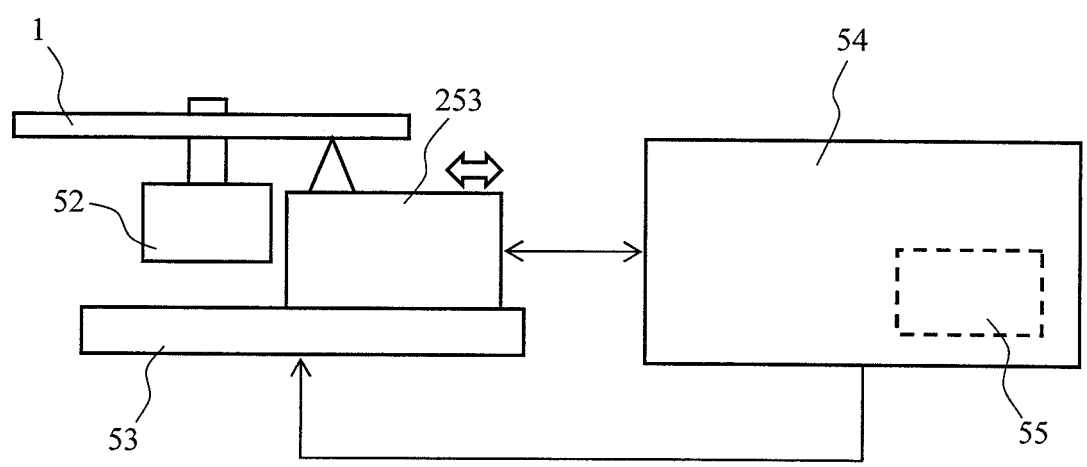
FIG. 18 is a schematic diagram showing a configuration example of an optical disc device.

FIG. 18 shows a configuration example of an optical disc device. The optical disc 1 is rotated by a spindle motor 52. The optical head 253 is formed of the optical system including the light source used for recoding and reading, the objective lens, and so forth. Since this device is based on the present invention, the device applies the homodyne detection method to the reading optical system. A pick-up performs seeking by use of a slider 53. The seeking operation, rotation of the spindle motor, and so forth are executed in accordance with instruction from a main circuit 54. Discrete circuits including a signal processing circuit, a feedback controller and the like, a microprocessor, a memory, and so forth are embedded in the main circuit 54. Firmware 55 controls overall operations of the optical disc device. The firmware 55 is stored in the memory inside the main circuit 54.

It is to be understood that the present invention is not limited only to the above-described embodiment and includes various other modifications. For example, the above-described embodiment has been described in detail so as to explain the present invention clearly. Therefore, the present invention is not always limited to the configuration including all the constituents described above. Moreover, it is also possible to replace part of a configuration of a certain embodiment of the present invention with a configuration of another embodiment. Meanwhile, it is also possible to add a configuration of another embodiment to a configuration of a certain embodiment of the present invention. Further, for a part of the configuration of each embodiment, addition, deletion, or replacement of another configuration is possible.

Moreover, the configurations, functions, processing units, processing means, and the like described above may be entirely or partially realized as hardware by means of designing in the form of an integrated circuit and the like. Meanwhile, the configurations, functions, and the like may be realized as software by causing a processor to interpret and execute programs for realizing the functions. The information in the form of programs, tables, files and the like for realizing the functions can be stored in a storage device such as a memory, a hard disc or an SSD (solid state drive), or in a recording medium such as an IC card, a SD card, a DVD and the like.

| Explanation of Reference Numerals | |
|---|---|
| 1 | optical disc |
| 10 | phase modulator |
| 52 | spindle motor |
| 53 | slider |
| 54 | main circuit |
| 55 | firmware |
| 101 | semiconductor laser |
| 102 | collimator lens |
| 103 | half-wavelength plate |
| 104 | polarizing beam splitter |
| 106 | quarter-wavelength plate |
| 107 | two-dimensional actuator |
| 108 | objective lens |
| 113 | condenser lens |
| 116 | mirror |
| 118 | non-polarizing half-beam splitter |
| 119 | half-wavelength plate |
| 120 | polarizing beam splitter |
| 121, 122 | detectors |
| 123 | quarter-wavelength plate |
| 124 | polarizing beam splitter |
| 125, 126 | detectors |
| 201 | AD converter |
| 202 | argument calculator |
| 203 | adaptive equalizer |

-continued

| | Explanation of Reference Numerals |
|---|---|
| 204 | adaptive equalizer coefficient controller |
| 205 | PRML decoder |
| 206 | pattern detector |
| 207 | delay unit |
| 208 | shift evaluator |
| 209 | phase evaluator |
| 210 | switcher |
| 220 | decoded pattern register |
| 221 | pattern comparator |
| 222 | register |
| 223 | detection target pattern table |
| 224 | selector |
| 225 | counter |
| 226 | integrator |
| 240 | optical system |
| 241 | homodyne detection system |
| 242 | phase edge shift detection system |
| 243 | compensation table |
| 244 | phase modulator |
| 250 | convolver |
| 251 | puncture unit |
| 252 | interleaver |
| 253 | optical head |
| 255 | de-interleaver |
| 256 | Viterbi decoder |
| 260 | unity delay unit |
| 261 | binary adder |

What is claimed is:

1. A signal evaluation method comprising the steps of:
optically reading digital information stored in a recording medium, the digital information representing a phase signal, the phase signal defined as a signal representing an optical phase difference between a phase of a reference light and a phase of a reading light; and
extracting, from the digital information, a predetermined digital pattern corresponding to a phase value.

2. The signal evaluation method according to claim 1, wherein a non-equalized signal is used as the phase signal.

3. The signal evaluation method according to claim 1, wherein an equalized signal is used as the phase signal.

4. The signal evaluation method according to claim 1, wherein in addition to the phase value, also extracted from the phase signal is a shift, in a time axis direction, from a target wave corresponding to the predetermined digital pattern.

5. The signal evaluation method according to claim 1, wherein the step of extracting, from the digital information, a predetermined digital pattern corresponding to a phase value includes the steps of:
decoding the phase signal by using a most-likely partial response decoder; and
searching for the predetermined digital pattern from the result of the decoding, and
wherein a length of the digital pattern is equal to or longer than a constraint length of a partial response class employed by the most-likely partial response decoder.

6. An information recording method for recoding digital information in a recording medium so that the digital information is optically readable as an optical phase, comprising the steps of:
optically reading the digital information stored in the recording medium, the digital information representing a phase signal, and the phase signal defined as a signal representing an optical phase difference between a phase of a reference light and a phase of a reading light;
extracting, from the digital information, a predetermined digital pattern corresponding to a phase value; and
changing a recording condition, so as to approximately equalize the extracted phase value to a predetermined value.

7. An information recording method for recoding digital information in a recording medium so that the digital information is optically readable as an optical phase, comprising the steps of:
optically reading the digital information stored in the recording medium, the digital information representing a phase signal, the phase signal defined as a signal representing an optical phase difference between a phase of a reference light and a phase of a reading light;
extracting, from the phase signal, a phase value corresponding to a predetermined digital pattern, and a shift, in a time axis direction, from a target wave corresponding to the predetermined digital pattern; and
changing a recording condition, so as to approximately equalize the extracted shift in the time axis direction to a predetermined value.

8. A read signal evaluation apparatus comprising:
a reading unit configured to read digital information stored in a recording medium, the digital information representing a phase signal, the phase signal defined as a signal representing an optical phase difference between a phase of a reference light and a phase of a reading light;
a decoder configured to decode the phase signal;
a pattern detector configured to detect a predetermined digital pattern in the result of the decoding by the decoder; and
a calculator configured to calculate a statistical average of the phase signal from which the predetermined digital pattern is detected by the pattern detector.

9. The read signal evaluation apparatus according to claim 8, further comprising:
an equalizer configured to equalize the phase signal,
wherein the decoder is configured to decode the phase signal equalized by the equalizer, and the calculator is configured to calculate the statistical average of the phase signal equalized by the equalizer.

10. The read signal evaluation apparatus according to claim 8,
wherein the reading unit includes a homodyne detection system.

11. The read signal evaluation apparatus according to claim 8,
wherein the decoder is a most-likely partial response decoder; and
wherein the predetermined digital pattern has a length equal to or longer than a constraint length of a partial response class employed by the most-likely partial response decoder.

12. The read signal evaluation apparatus according to claim 8,
wherein a plurality of the digital patterns are prepared respectively corresponding to different phase values.

13. A read signal evaluation apparatus comprising:
a reading unit configured to read digital information stored in a recording medium as a phase signal;
a decoder configured to decode the phase signal;
a pattern detector configured to detect a predetermined digital pattern in the decoding result by the decoder; and
a calculating means for calculating a statistical average of the phase signal from which the predetermined digital pattern is detected by the pattern detector;
wherein the reading unit comprises a homodyne detection system.

* * * * *